(12) United States Patent
Dissen et al.

(10) Patent No.: US 10,480,557 B2
(45) Date of Patent: Nov. 19, 2019

(54) CONSTRUCTION KIT AND INSTALLATION ASSEMBLY AND METHOD FOR THE PRODUCTION THEREOF

(71) Applicant: PALM, LIONEL & DISSEN, GERALD GBR—ROOM IN A BOX, Berlin (DE)

(72) Inventors: Gerald Dissen, Berlin (DE); Lionel Palm, Berlin (DE); Christian Hilse, Berlin (DE)

(73) Assignee: ROOM IN A BOX GMBH & CO. KG, Berlin (DE)

( * ) Notice: Subject to any disclaimer, the term of this patent is extended or adjusted under 35 U.S.C. 154(b) by 225 days.

(21) Appl. No.: 15/310,910

(22) PCT Filed: May 11, 2015

(86) PCT No.: PCT/EP2015/060322
§ 371 (c)(1),
(2) Date: Nov. 14, 2016

(87) PCT Pub. No.: WO2015/173174
PCT Pub. Date: Nov. 19, 2015

(65) Prior Publication Data
US 2017/0089378 A1  Mar. 30, 2017

(30) Foreign Application Priority Data

May 12, 2014  (DE) .................. 10 2014 106 608

(51) Int. Cl.
*F16B 12/00* (2006.01)
*A47F 5/11* (2006.01)
(Continued)

(52) U.S. Cl.
CPC .......... *F16B 12/00* (2013.01); *A47B 47/0075* (2013.01); *A47C 5/005* (2013.01);
(Continued)

(58) Field of Classification Search
CPC ...... F16B 12/00; F16B 12/54; A47B 47/0075; A47C 5/005; A47C 19/005; A47F 5/10;
(Continued)

(56) References Cited

U.S. PATENT DOCUMENTS

| 489,664 A | * | 1/1893 | Shepard | ............... B65D 85/327 |
| | | | | 217/32 |
| 2,261,164 A | * | 11/1941 | Krauss | ................. B65D 85/325 |
| | | | | 206/521.6 |

(Continued)

FOREIGN PATENT DOCUMENTS

DE   9401502 U1   4/1994
DE   9409883 U1   12/1994
(Continued)

OTHER PUBLICATIONS

Notification of Transmittal of International Preliminary Report on Patentability dated Nov. 24, 2016, from PCT Application No. PCT/EP2015/060322.

(Continued)

*Primary Examiner* — Christopher R Demeree
(74) *Attorney, Agent, or Firm* — Kriegsman & Kriegsman

(57) ABSTRACT

The present invention relates to a construction kit for a collapsible frame structure (1), wherein the construction kit is characterized in that the construction kit comprises flat components of type A (15, 25, 35) and components of at least one type B (20, 30, 40, 45), which are each formed in the shape of rectangles, which each have two long sides and two edge sides, wherein the components of type A (15, 25, 35) and of type B (20, 30, 40, 45) each have a thickness D and each have an identical length L and an identical width W, the components of type A (15, 25, 35) and of type B (20, 30, 40, 45) are each subdivided into n equally large sections (Continued)

Figure 1:
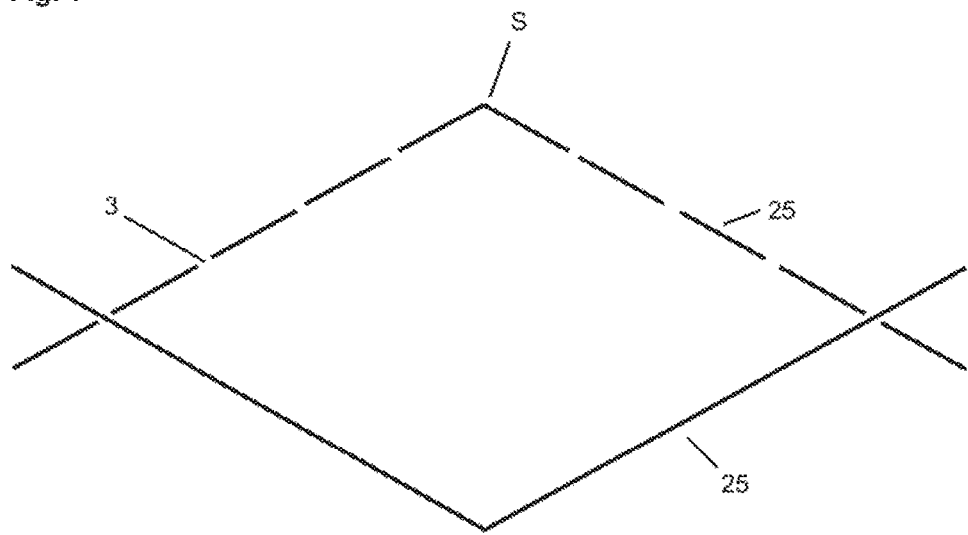

of length L/n, which are bounded by n+1 sectional boundaries, wherein the edge sides of the components of types A and B (20, 30, 40, 45) form the respective outer sectional boundaries and the central vertical line between the long sides of the respective components forms the central sectional boundary, wherein the central vertical line is an axis of symmetry S, and wherein, in the components of type A, on a long side of the respective component, n−2 slots are arranged along a partial length of the respective sectional boundaries and are located between the edge sides and the axis of symmetry S, and wherein, in the components of type B (20, 30, 40, 45), n−4 slots are arranged along selected sectional boundaries and are located between the edge sides and the axis of symmetry S, wherein, starting from a long side, some of the n−4 slots are arranged along a partial length of the respective sectional boundaries, and, starting from the other long side, the other n−4 slots are arranged on the respective other sectional boundaries, and wherein, starting from a long side, at least 2 of the n−4 slots of the components of type B (20, 30, 40, 45) are each arranged along the sectional boundaries and are directly adjacent to the axis of symmetry and, furthermore, starting from the other long side of the component, at least 2 of the n−4 slots of the component of type B (20, 30, 40, 45) are arranged along the sectional boundaries and are adjacent to the respective edge sides, and n is 8, 10, or 12. The invention further relates to a method for producing an installation assembly (2) of the construction kit according to the invention and a method for the production thereof.

12 Claims, 5 Drawing Sheets

(51) Int. Cl.
| | |
|---|---|
| *F16B 12/54* | (2006.01) |
| *A47C 19/00* | (2006.01) |
| *B65D 5/49* | (2006.01) |
| *A47F 5/10* | (2006.01) |
| *A47B 47/00* | (2006.01) |
| *A47C 5/00* | (2006.01) |
| *A47B 96/04* | (2006.01) |

(52) U.S. Cl.
CPC .............. *A47C 19/005* (2013.01); *A47F 5/10* (2013.01); *A47F 5/11* (2013.01); *B65D 5/48038* (2013.01); *F16B 12/54* (2013.01); *A47B 96/04* (2013.01); *A47B 2220/0083* (2013.01); *A47B 2220/0086* (2013.01); *A47B 2230/0092* (2013.01)

(58) Field of Classification Search
CPC ....... A47F 5/11; B65D 5/48038; B65D 25/04; B65D 25/48026; B31D 5/0004
USPC ............ 229/100, 120.36; 220/552, 507, 510, 220/529, 533
See application file for complete search history.

(56) References Cited

U.S. PATENT DOCUMENTS

| | | | | |
|---|---|---|---|---|
| D138,782 | S | * | 9/1944 | Schwartzberg ................. 217/32 |
| 2,974,817 | A | | 3/1961 | Simpson |
| 3,059,825 | A | * | 10/1962 | Thomas ............. B65D 5/48026 217/30 |
| 4,000,845 | A | * | 1/1977 | Zeller ................ B65D 5/48038 217/32 |
| 4,224,705 | A | | 9/1980 | Santo |
| 4,358,047 | A | * | 11/1982 | Raubenheimer ... B65D 5/48038 217/32 |
| 4,746,053 | A | * | 5/1988 | Nichols .............. B65D 5/48038 217/30 |
| 4,945,689 | A | * | 8/1990 | Johnson, Jr. ............ E01C 11/16 52/668 |
| 5,626,284 | A | * | 5/1997 | Franzen ............. B65D 5/48038 229/120.36 |

FOREIGN PATENT DOCUMENTS

| | | |
|---|---|---|
| DE | 29511571 U1 | 10/1995 |
| DE | 102004040603 A1 | 3/2006 |
| DE | 202006003128 U1 | 5/2006 |
| DE | 202005009709 U1 | 7/2006 |
| DE | 10352206 B4 | 12/2010 |
| DE | 202011052168 U1 | 4/2013 |
| JP | 2009005801 A | 1/2009 |
| WO | 2011067488 A1 | 6/2011 |
| WO | 2014191854 A1 | 12/2014 |

OTHER PUBLICATIONS

Antoinette Bader cardboard bed, www.antoinettebader.net (Jun. 12, 2014).

* cited by examiner

CONSTRUCTION KIT AND INSTALLATION ASSEMBLY AND METHOD FOR THE PRODUCTION THEREOF

The present invention relates to a construction kit for a collapsible, uniform frame structure. The invention further relates to an installation assembly that is produced by means of the construction kit according to the invention, and a method for the production thereof.

Collapsible frames are known in the prior art. Frames of this kind find use in various areas as transport and packaging aids, sales racks, or furnishings.

Shipping and display packagings having a frame structure that are generally known in the prior art are described in DE 29511571 U1, for example. Described as materials are foldable materials, such as cardboard or corrugated cardboard. The packaging is composed of a tray and a frame situated in it, which has frame walls arranged crosswise.

DE 10 2004 040603 A1 discloses the use of hollow sections made of cardboard, pasteboard, or synthetic resin bonded paper for the production of furnishings. The hollow sections are fastened to one another by using connection aids such as keys of conical bolts. A drawback of the use of hollow sections is the inability to collapse them and thereby store them in a space-saving manner. Moreover, it is necessary to use connection pieces in order to ensure the stability of the furnishings.

Furthermore, furnishings, in particular shelves, that are composed of boards that can be inserted into one another are described in DE 20 2011 052 168 U1. The boards are composed of paper or plastic materials and are adhesively bonded to one another for improvement of the stability. These furnishings can no longer be collapsed in their assembled state.

Further, known in the prior art is a cardboard bed (Antoinette Bader, http://www.antoinettebader.net/pro_betten.html) that has a frame structure. This cardboard bed of the prior art differs from the subject of the present invention in that, in particular, no construction kit with which a frame structure of any length and width can be produced is used. This cardboard bed is composed of a plurality of frame webs. The frame webs are placed next to one another in order to create the surface of a bed. A drawback of this cardboard bed is the danger that the frame webs forming the lying surface will slip out of place.

In addition, the frame of this cardboard bed of the prior art is not formed homogeneously. The frame structure is composed of large and small rhombi. For this reason, the cardboard bed has regions of differing stability, since the stability of the frame structure is largely influenced by the vertical sections that span the rhombus structure.

Furthermore, the frame webs of this cardboard bed of the prior art have open, bracket-like regions that protrude into space perpendicularly to the plane of the frame webs. This is not only detrimental to the aesthetic appearance. During use, these bracket-like regions are able not only to kink, but also pose a tripping danger when persons catch on them.

The object of the present invention is therefore to overcome the drawbacks of the prior art.

The object of the invention is to provide a construction kit by means of which it is possible to produce a collapsible frame structure that has a high symmetry, homogeneity, and stability and can be provided in dimensions that are conventional, for example, for lying surfaces of beds.

It is also the object of the present invention to provide a construction kit that comprises as few types of components as possible. This has a positive effect on the production costs.

Moreover, it is the object of the present invention to provide a method by means of which an installation assembly can be constructed from the construction kit according to the invention.

Furthermore, it is the object of the invention to provide installation assemblies that overcome the drawbacks of the prior art.

The object of the present invention is achieved by the provision of a construction kit that comprises at least two types A and B and that can be used for the construction of installation assemblies.

Furthermore, the object of the invention is achieved by the provision of a method by means of which installation assemblies can be produced from the construction kit according to the invention.

Moreover, the object of the invention is achieved by the provision of installation assemblies that can be built by means of the construction kit according to the invention.

The object of the present invention is achieved by the provision of a construction kit for a collapsible frame structure, wherein this construction kit comprises flat components of type A and components of at least one type B, which are each formed in the shape of rectangles, which each have two long sides and two edge sides, wherein the components of type A and of type B each have a thickness D and each have an identical length L and an identical width W, the components of type A and of type B are each subdivided into n equally large sections of length $L/n$, which are bounded by $n+1$ sectional boundaries, wherein the edge sides of the components of type A and B form the respective outer sectional boundaries, and the central vertical line between the long sides of the respective components forms the central sectional boundary, wherein the central vertical line is an axis of symmetry S, and wherein, in the components of type A, on a long side of the respective component, $n-2$ slots are arranged along a partial length of the respective sectional boundaries and are located between the edge sides and the axis of symmetry S, and wherein, in the components of type B, $n-4$ slots are arranged along selected sectional boundaries and are located between the edge sides and the axis of symmetry S, wherein, starting from a long side, a portion of the $n-4$ slots are arranged along a partial length of the respective sectional boundaries, and, starting from the other long side, the other $n-4$ slots are arranged on the respective other sectional boundaries, and wherein, starting from a long side, at least 2 of the $n-4$ slots of the components of type B are each arranged along the sectional boundaries and are directly adjacent to the axis of symmetry and, furthermore, starting from the other long side of the component, at least 2 of the $n-4$ slots of the component of type B are arranged along the sectional boundaries and are adjacent to the respective edge sides, and n is 8, 10, or 12.

Especially preferred is a construction kit for which n is 8 and the components of type A and B are subdivided into 8 equally large sections, which are bounded by 9 sectional boundaries, wherein, in the components of type A, 6 slots are arranged, which are disposed along a partial length of the respective sectional boundaries and are located between the edge sides and the axis of symmetry S, and wherein, in the components of type B, 4 slots are arranged, which are disposed along a partial length of the respective sectional boundaries, of which, starting from a long side, 2 slots are each arranged along the sectional boundaries and are directly adjacent to the axis of symmetry, and wherein, starting from the other long side of the component, 2 slots are arranged along the sectional boundaries and are adjacent to the respective edge sides.

Especially preferred is a construction kit for which n is 10 and for which the components of type A and B are subdivided into 10 equally large sections, which are bounded by 11 sectional boundaries, wherein, in the components of type A, 8 slots are arranged, which are disposed along a partial length of the respective sectional boundaries and are located between the edge sides and the symmetry of axis, and wherein, in the components of type B, 6 slots are arranged, which are disposed along a partial length of the respective sectional boundaries, 2 slots of which, starting from a long side, are each arranged along the sectional boundaries and are directly adjacent to the axis of symmetry, and wherein 2 slots, starting from the other long side of the component, are arranged along the sectional boundaries and are adjacent to the respective edge sides, and 2 other slots are arranged on the respective sectional boundaries of this long side and are directly adjacent to these slots adjacent to the respective edge side.

Further preferred is a construction kit for which n is 12 and for which the components of type A and B are subdivided into 12 equally large sections, which are bordered by 13 sectional boundaries, wherein, in the components of type A, 10 slots are arranged, which are disposed along a partial length of the respective sectional boundaries and are located between the edge sides and the axis of symmetry, and wherein the construction kit further comprises components of two different types B, namely B1 and B2, which each have 8 slots, which are arranged along a partial length of the respective sectional boundaries, wherein, in the component of type B1, 2slots are each arranged, starting from a long side, along a partial length of the respective sectional boundaries and are directly adjacent to the axis of symmetry, and 6 slots are arranged, starting from the other long side of the component, along a partial length of the respective three adjacent sectional boundaries and are located between the respective edge regions and the axis of symmetry, and wherein, in the component of type B2, 6 slots are each arranged, starting from a long side, along a partial length of the respective sectional boundaries and are located between the axis of symmetry and the respective edge sides, and 2 slots are arranged, starting from the other long side of the component, along a partial length of the respective sectional boundaries and are directly adjacent to the respective edge sides.

Particularly advantageous is an embodiment of the construction kit, for which the slots of the component of type A each have an identical length $L_A$ and the slots of the components of type B each have an identical length $L_B$, and the sum of the lengths $L_A$ and $L_B$ is greater than or equal to the width of the components.

Especially advantageous is an embodiment of the construction kit for which the slots of the components have a width, wherein the width is greater than or equal to the thickness D of the components, wherein, for use of components of different thickness D, the width $W_S$ is greater than or equal to the thickness of the components having the greatest thickness D.

Further advantageous is a construction kit for which the components of type A and the components of type B have at least one fold, which is arranged along a sectional boundary.

Preferred in accordance with the invention is a construction kit for which the components are produced from cardboard, corrugated cardboard, paperboard, wood, plastic, metal, textile fabric, or from composite materials of the materials mentioned.

Advantageous is a construction kit for which the components have a protective layer, selected from water-repellant or/or flame-retardant materials, and/or a decorative layer, selected from paints, films, lacquers, textiles, and/or flocking.

Also advantageous is a construction kit for which openings into which rods, tubes or pipes, wires, bands, or cords can be inserted are provided in the components.

The object of the invention is further achieved by the provision of a method for producing an installation assembly by using a construction kit according to the invention, for which a frame structure is built up by joining a plurality of components of type A to one another by inserting their respective slots together to join them and, when a construction kit for which n is 8 or 10 is used, the two open edge portions are each terminated by means of a component of type B or, when a construction kit for which n is 12 is used, the two open edge portions are each terminated with a component of type B1 and of type B2.

Moreover, the object of the invention is achieved by the provision of an installation assembly that is produced by using a construction kit according to the invention and exists in the form of a bed, a stool, a platform, or a seat.

The flat components of type A and types B, B1, and B2 of the construction kit according to the invention are formed in the shape of rectangles. However, in accordance with the invention, components with an approximately rectangular basic structure can also be used. "Approximately rectangular" is understood in connection with the present invention to mean a basic structure that exhibits only minor departure from the rectangular basic structure. In this connection, minor departure is understood to mean rounded corners, for example.

The components each have a length L and a width W, which define the rectangular basic shape. Furthermore, the components have a thickness D. On account of the very small thickness D of the components in relation to the ratio of the length L to the width W, their structure is also referred to as flat. This characterization, however, should not stand in contrast to the fact that the components are necessarily three-dimensional and cuboid in shape on account of their L, W, D extensions.

Furthermore, the components will be described with reference to sections and sectional boundaries. The components A, B, B1, and B2 of the construction kit according to the invention are formed from n equally large sections. The arrangement of the slots in the components will be explained by means of these references. Through a change in the width of the outermost section at one or both edge sides of the respective components, without any change in the further arrangement of the sectional boundaries, starting from the axis of symmetry, there is no departure from the scope of application of the present invention. Accordingly, those construction kits for which the component is extended in length beyond the edge sides of the components on one side or on both sides, so that the outermost section is enlarged, are also kits in accordance with the invention. Analogously, a shortening of the sections adjacent to the edge sides does not lead to any departure from the scope of application of the invention, as long as this shortening does not lead to loss of the entire outer section.

The components of the construction kit according to the invention can additionally include apertures, in addition to the slots according to the invention. These apertures can be present in all components of the construction kit according to the invention or they can be provided only in some components. By means of these apertures, which, for example, can be designed as a plurality of small openings (perforations) or as a smaller number of larger openings, the weight of the components is reduced. However, in order to ensure the requisite stability of an installation assembly produced from the construction kit according to the invention, the number of apertures is limited, depending on the planned purpose of application of the installation.

Figure 2:
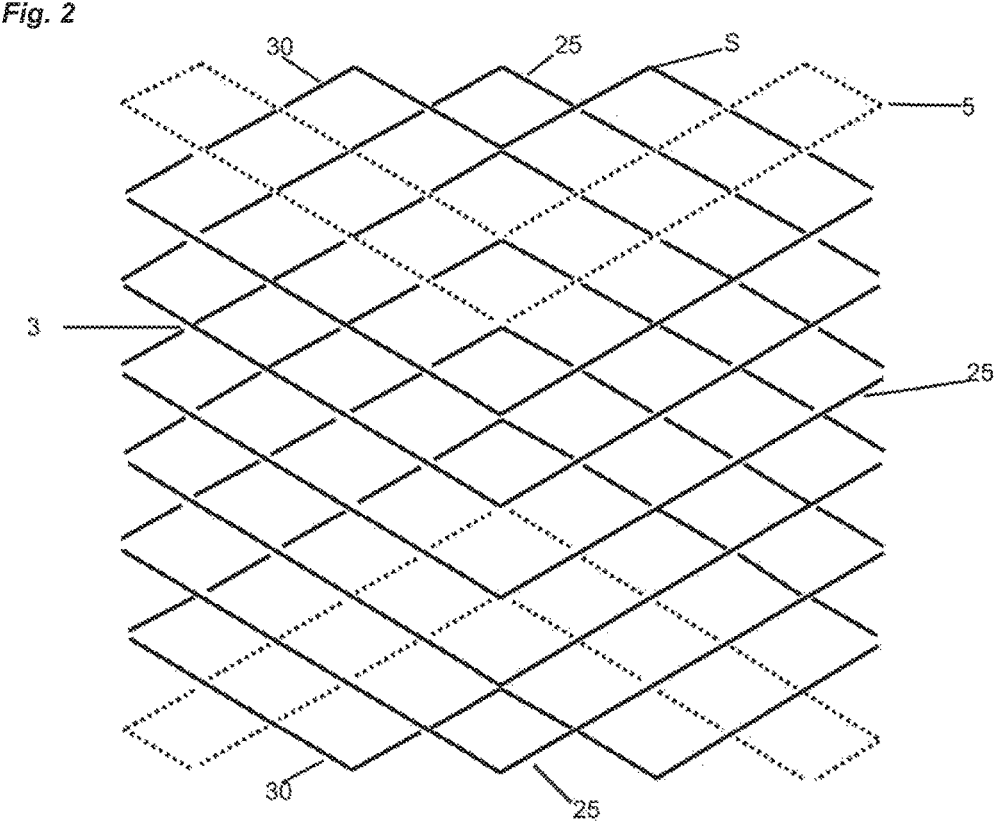
Figure 3:
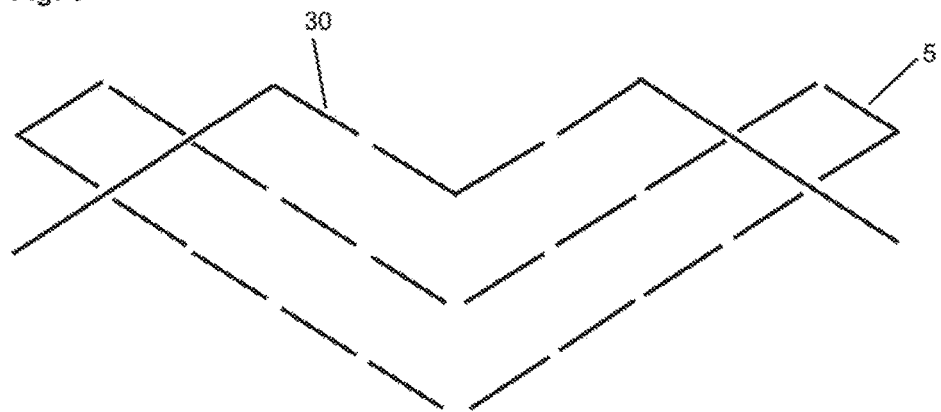
Figure 4:
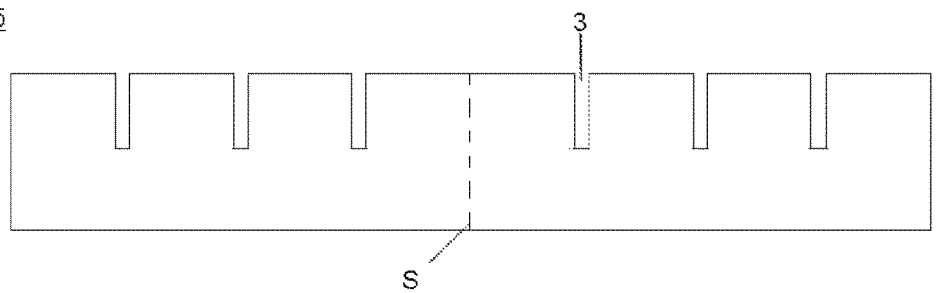
Figure 5:
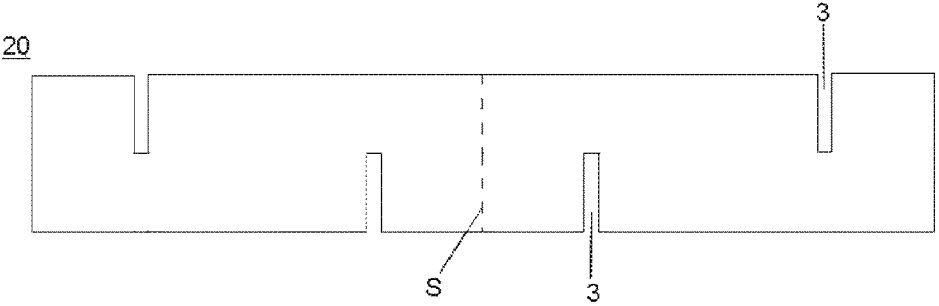
Figure 6:
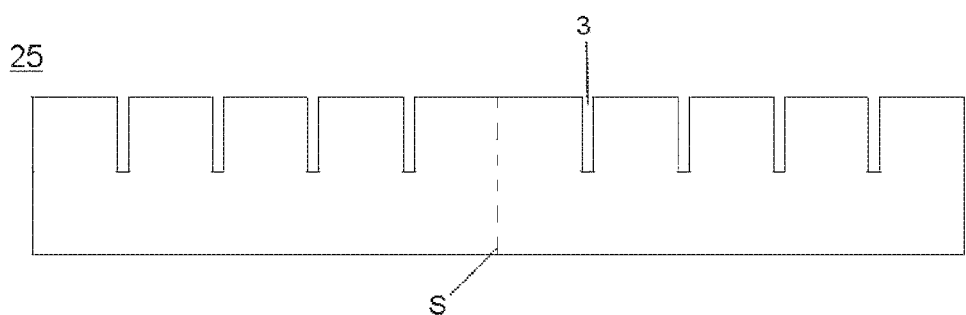
Figure 7:
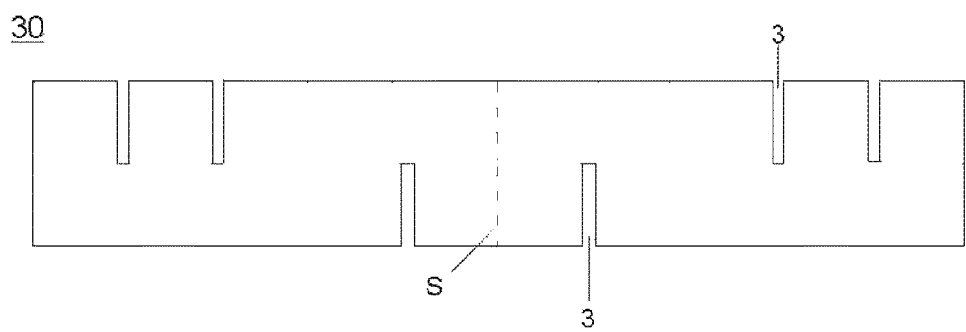
Figure 8:
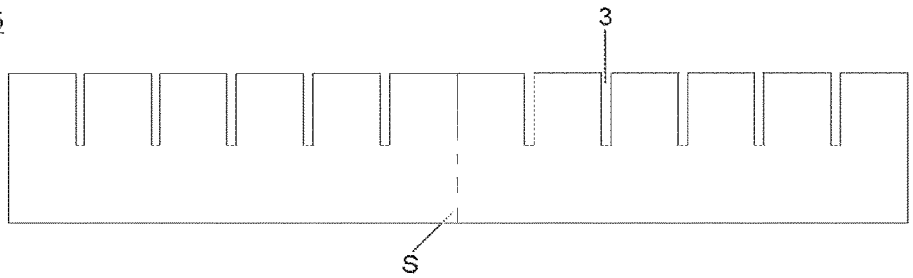
Figure 9:
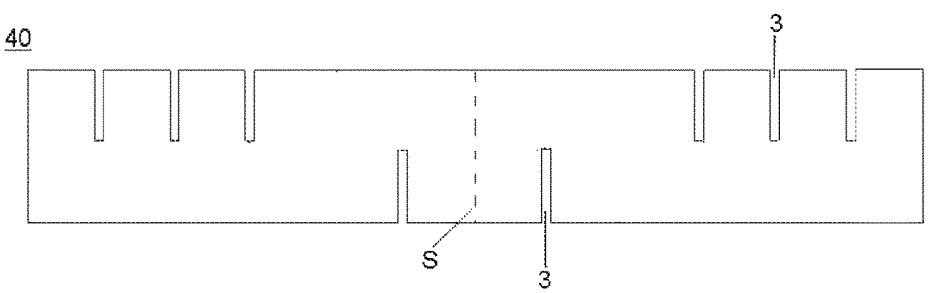
Figure 10:
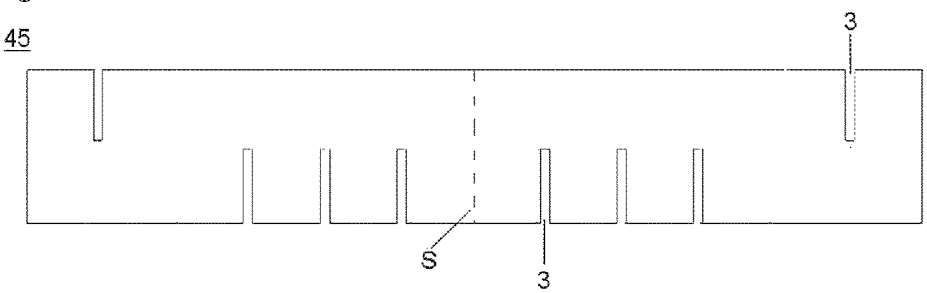
Figure 11:
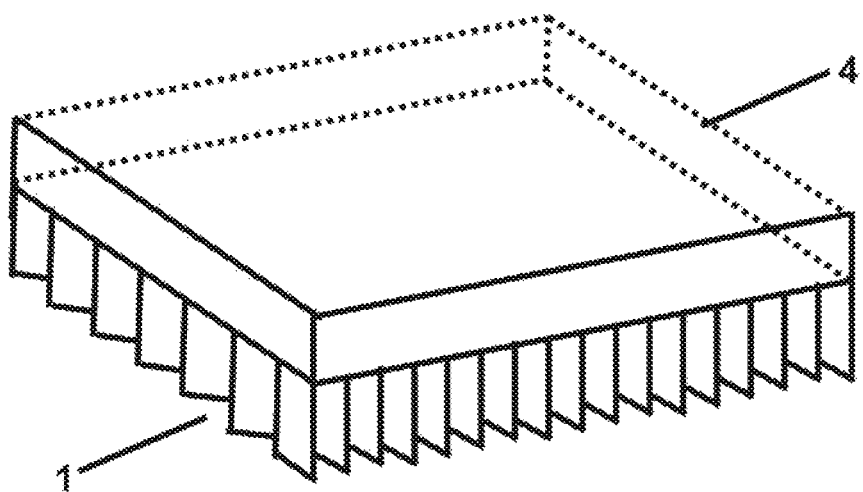

The present invention will now be explained in detail by using the attached drawings. Shown are:

FIG. 1 a plan view on a subunit of the central part of the frame structure, which is composed of two components of type A, where n is 10;

FIG. 2 a schematic plan view on the frame structure 1 formed by means of an embodiment of the construction kit according to the invention;

FIG. 3 a plan view on an end piece, which is formed from a component of type B and two components of type A, where n is 10;

FIG. 4 a schematic illustration of a component of type A, for which n is 8;

FIG. 5 a schematic illustration of a component of type B, for which n is 8;

FIG. 6 a schematic illustration of a component of type A, for which the number of sections n in the components is 10;

FIG. 7 a schematic illustration of a component of type B, for which the number of sections n in the components is 10;

FIG. 8 a schematic illustration of a component of type A, for which the number of sections n in the components is 12;

FIG. 9 a schematic illustration of a component of type B1, for which the number of sections n in the components is 12;

FIG. 10 a schematic illustration of a component of type B2, for which the number of sections n in the components is 12;

FIG. 11 an embodiment of the installation assembly according to the invention, illustrated as a bed.

The present invention discloses a construction kit for a collapsible frame structure. This construction kit can be used to produce installation assemblies.

Surprisingly, the inventors have found that the use of at most three types of components allows the creation of homogeneous, symmetrical, and stable frame structures. The use of at most three types of components is particularly advantageous, because a small number of different components entail relatively low production costs.

In two exemplary embodiments of the present invention, the construction kit according to the invention comprises only components of the two types A and B. In another exemplary embodiment according to the invention, the construction kit comprises components of type A and components to two different types B, namely, B1 and B2.

All exemplary embodiments of the invention have advantageous properties when compared to the prior art. All enable the construction of stable, collapsible frame structures, which can be built in any desired length, width, and height. In the process, it is particularly advantageous that even larger installation assemblies can be built in one piece by use of the construction kit. An assembly composed of several frame webs is not required in this case.

The inventors have found that a construction kit with components of type A having n sections, where n is 8, 10, or 12 and type A has 6, 8, or 10 slots, and with components selected from at most two B types achieves the object of the invention.

The collapsible frame structure, which is built by means of the exemplary embodiments of the construction kit according to the invention, is composed of a symmetrical structure, which is built from components of type A. The components of type A are joined to one another as shown in FIG. 1.

The two ends of the structure are terminated by the use of components of type B. If a construction kit is utilized for which one component of type A having 6 slots or having 8 slots is used, only one component of type B is attached to the respective ends of the structure. If a construction kit is utilized for which one component of type A having 10 slots is used, a component of type B1 and of type B2 is joined to a component of type A at each of the two ends of the structure in order to form the termination.

Especially preferred is an exemplary embodiment of the invention in which the construction kit comprises components of type A having 8 slots and, further, only components of type B. When the construction kit is used for constructing an installation assembly, this construction kit offers a further advantage. It is possible by means of this construction kit to construct a frame structure that is also terminated at the outer side regions insofar as no bracket-like material ends will protrude.

The protruding of bracket-like parts on a frame structure is a drawback that arises in the already discussed cardboard bed of the prior art. These bracket-like regions extend perpendicular to the plane of the frame webs and, in the case of the cardboard bed of prior art, project into space. This is not only detrimental to the aesthetic appearance. During use, these bracket-like regions are able not only to kink, but also pose a tripping danger when persons catch on them.

The construction kit according to the invention, which also overcomes this drawback of the prior art, comprises a total of only two components of type B. All other components are components of type A. This means that, regardless of the dimensions of the assembly to be built, the number of components of type B to be used is always two.

How an installation assembly will be built from a construction kit according to the invention will be described in detail in Example 4.

The installation assemblies according to the invention can be collapsed in a space-saving manner following their assembly from the construction kit according to the invention. Although a disassembly of the structure is possible in fact, it is not necessary, however, for space-saving accommodation thereof.

During use, the stability can be increased and the flexibility of the structure can be limited by placing stabilizing means, such as rods, tubes or pipes, wires, bands, or cords, through openings in the side regions. It is possible by means of these stabilizing means to additionally fix in place the structure in a state between its minimal and maximal unfolding.

However, it is possible to fix in place the frame structure according to the invention between the minimum unfolding and the maximum unfolding by way of, for example, an overlying support, such as a mattress.

The length and width of the installation assembly constructed by means of the construction kit according to the invention depends, for a pre-given length L of the components, on the degree of unfolding of the frame structure. Thus, the extensions of the frame structure can be altered by enlarging or reducing the angle that is formed in the components of type A between sections adjacent to the axis of symmetry. An unfolding that leads to an increase in the length of the installation assembly, at the same time, brings about a reduction in the width.

If the components are to be fixed in place permanently in an unfolded structure, the connecting sites of the components can be fixed in place additionally by using adhesive bonding means. However, for conventional use, this fixation is not required. It is only advised when the installation assembly is to be subjected to an exceptional load. When it is used as a platform, where flexibility of the structure needs to be nearly excluded for reasons of safety, for example, this may be recommended.

The invention will be further explained below on the basis of preferred exemplary embodiments with reference to the attached figures, without, however, the scope of the invention being limited by these exemplary embodiments.

Shown in FIGS. 1, 2, and 3 are schematic illustrations of partial structures of an exemplary embodiment according to the invention of the frame structure according to the invention. Selected for illustration was the exemplary embodiment for which a construction kit with components of type A, marked with reference numbers 25, having 10 sections and 8 slots 3, were used for construction. The components of type B, marked with reference numbers 30, have 10 sections and 6 slots. The construction kit used corresponds to the construction kit of Example 2; the method for construction of this structure will be explained in detail in Example 4.

FIG. 1 shows a plan view on a partial excerpt of the structure, which is formed from two components of type A. Shown is a subunit of the central part of the frame structure.

Shown in FIG. 2 is a schematic plan view on the complete frame structure 1. The corner pieces 5 of the structure are illustrated as broken lines.

FIG. 3 illustrates an end piece of a frame structure according to the invention. The end piece shown belongs to the exemplary embodiment for which n is 10. As shown in this view, the component of type A is folded not only along the axis of symmetry S, but also at an adjacent sectional boundary. It is fundamentally possible to bend components of type A and of types B, B1, and B2 along any sectional boundary, also along the slots.

Reference number 5 is used to characterize this component of type A, which is folded in a special way.

Described in detail in Example 4, with reference to FIGS. 1 to 3, is how the frame structure of this exemplary embodiment is built.

Shown in FIGS. 4 to 10 are components of type A of the exemplary embodiments according to the invention, characterized by reference numbers 15, 25, 35; type B, characterized by reference numbers 20 and 30; B1 characterized by reference number 40; and B2, characterized by reference number 45.

Thus, FIG. 4 shows the component 15 of type A of a construction kit according to the invention, for which n is 8 and the component of type A has 6 slots 3. Shown in FIG. 5 is the component 20 of type B of this construction kit. The component of type B has 4 slots 3.

This construction kit is also described in Example 1.

Shown in FIGS. 6 and 7 are components of the construction kit according to the invention, for which n is 10. The component 25 of type A, which is shown in FIG. 6, has 8 slots 3, and the component 30 of type B has 6 slots 3, which is illustrated in FIG. 7. This construction kit is described in Example 2. Further disclosed in Example 4 is how a frame structure according to the invention is constructed from this construction kit. FIGS. 1 to 3 also show detailed illustrations of a structure that was constructed from this construction kit.

The components 35 of type A, of type B1, characterized by reference number 40, and of type B2, characterized by reference number 45, of a construction kit according to the invention, for which n is 12, are illustrated in FIGS. 8, 9, and 10. In this case, FIG. 8 shows the component 35 of type A of this construction kit, which has 10 slots 3. The component of type B1, 40, is shown in FIG. 9, and the component of type B2, 45, is shown in FIG. 10. This construction kit is also described in Example 3.

Shown in FIG. 11 is an embodiment of the installation assembly 2 according to the invention. Illustrated is the frame structure 1, on which an overlying support 4 lies. This overlying support will be a mattress, for example, when the installation assembly is used as a bed.

EXAMPLE 1

Construction Kit 1

Preferred in accordance with the invention is a construction kit that comprises components 15 of type A having 6 slots 3 and comprises components 20 of type B, which have 4 slots 3. For construction of a frame structure, 2 components 20 of type B are required. The number of components 15 of type A is governed by the desired dimensions of the assembly.

EXAMPLE 2

Construction Kit 2

In a preferred embodiment of the invention, the construction kit comprises components 25 of type A having 8 slots 3 and components 30 of type B having 6 slots 3.

For construction of a frame structure, 2 components 30 of type B are required. The number of components 25 of type A is governed by the desired dimensions of the assembly.

EXAMPLE 3

Construction Kit 3

In a preferred embodiment, the construction kit comprises components 35 of type A having 10 slots 3 and components of two different types B, namely B1 (characterized by reference number 40) and B2 (characterized by reference number 45), each of which has 8 slots 3. For construction of a frame structure, in each case, 2 components, 40, 45, of types B1 and B2 are required. The number of components 35 of type A is governed by the desired dimensions of the assembly.

EXAMPLE 4

Frame Structure from the Construction Kit of Example 2

It will be explained below how a frame structure according to the invention is built from an embodiment of the construction kit according to the invention.

The construction kit according to the invention comprises components 25 of type A, which have 8 slots 3. The construction kit further comprises components 30 of type B, which have 6 slots 3.

The components of types A and B of this construction kit are subdivided into 10 equally large sections, which are bounded by 11 sectional boundaries. The 8 slots 3 of the components 25 of type A are arranged along a partial length of the respective sectional boundaries and are located between the edge sides and the axis of symmetry S. Arranged in the components 30 of type B are 6 slots 3, which are arranged along a partial length of the respective sectional boundaries, of which, starting from a long side, 2 slots are arranged respectively along the sectional boundaries and are directly adjacent to the axis of symmetry S. Two slots 3 are arranged, starting from the other long side of the component, along the sectional boundaries and are adjacent to the respective edge sides, and 2 other slots 3 are arranged on the respective sectional boundaries of this long side and are directly adjacent to these slots adjacent to the respective edge side.

In order to improve the homogeneity and the thereby resulting stability in comparison to the frame structures used in the prior art, two end pieces and a central part are formed from the construction kit of this exemplary embodiment according to the invention.

In connection with the explanation of this example, it is assumed that the frame structure according to the invention is assembled on a base (floor) from the construction kit according to the invention. The part of the frame structure that comes into contact with the floor during assembly, that is, is directed toward it, is referred to as "bottom" or "bottom side" or "lower side." The part of the frame structure facing away from the floor is referred to as "top" or "top side" or "upper part."

The central part of the frame structure is constructed from subunits (see FIG. 1), each of which is composed of two components 25 of type A that are joined together. The assembly of the subunit and the connection of subunits for construction of a frame structure according to the invention will be disclosed below. A frame structure according to the invention comprises at least one central part.

For construction of the subunit, two components 25 of type A, as shown schematically in FIG. 1, are brought together. As illustrated in FIG. 1, the components 25 of type A are joined together in such a way that a component 25 of type A is engaged with the slots 3 directed toward the bottom in the component 25 of type A. The second component 25 of type A is arranged with the slots 3 directed toward the top. In this way, the components 25 are joined to one another by means of the respective two slots 3 of the respective components 25 that are most distant from the axis of symmetry S.

On account of this linkage, 6 slots 3 still remain available in each case in the two components of type A of the subunit for the potential further engagement with other components.

If the frame structure according to the invention has more than one subunit, then the subunits are joined to one another by interlocking of slots. In the process, a subunit is inserted with its slots from the top into the slots of the other subunit such that free slots of the subunits that are most distant respectively in reference to the axis of symmetry S engage in one another in each case.

As needed, further subunits can be joined to this structure in order to produce a longer central part.

If the central part of the frame structure has the desired length, the construction is terminated by joining the end pieces to it.

For the embodiment according to the invention described in this example, 2 components 25 of type A and one component 30 of type B each form an end piece. This end piece is shown in FIG. 3.

In this figure, the component of type A is characterized by reference number 5 in order to point out the special folding of the component. In this case, in contrast to the central part of the frame structure, the component of type A is folded along the axis of symmetry and further along the sectional boundary directly adjacent to it. As a result, a section that forms the front surface area of an angled form of the component of type A that is now formed is divided. Owing to this folding, the component has two subregions, which are different in length, and it is also referred to as a corner piece in connection with the invention. The corner piece 5 is inserted from the top over the respective slots 3 of the slots lying in the sectional boundaries directly adjacent to the front surface area into the slots 3 of the component 30 of type B, which are pointing toward the top. In the process, the two corner pieces are inserted into component 30 in such a way that, in each case, the shorter subregion of the respective corner piece is adjacent to the axis of symmetry.

In each case, an end piece is then joined from the top or from the bottom to the central part by inserting the slots of the end piece into the slots of the central piece. When the central part and a respective end piece are joined, all open slots of the top side or bottom side that are available in the central part are engaged.

The provision of the construction kit according to the invention enables the production of collapsible frame structures that are suitable, in particular, for building installation assemblies. The advantageous properties of the installation assemblies according to the invention, such as the small number of different components that are required for the construction, the high stability and homogeneity of the installation assemblies, and the great flexibility in the choice of the dimensions of the assembly, overcome the drawbacks of the prior art.

LIST OF REFERENCE NUMBERS 1 frame structure
2 installation assembly (bed)
3 slot
4 overlying support
5 corner piece, component 25 with fold
S axis of symmetry
15 component type A, n=8, 6 slots
20 component type B, n=8, 4 slots
25 component type A, n=10, 8 slots
30 component type B, n=10, 8 slots
35 component type A, n=12, 10 slots
40 component type B, n=12, 8 slots
45 component type B, n=12, 8 slots

The invention claimed is:
1. A construction kit for a for a collapsible frame structure, is hereby characterized
in that the construction kit comprises flat components of type A and components of at least one type B, which are each formed as rectangles, each of which has two long sides and two edge sides, wherein the components of type A and of type B each have a thickness (D) and each have an identical length (L) and an identical width (W), the components of type A and of type B are each subdivided into n equally large sections of length L/n, which are bounded by n+1 sectional boundaries,
wherein the edge sides of the components of types A and B form respective outer sectional boundaries, and a central vertical line between the long sides of the respective components forms a central sectional boundary,
wherein the central vertical line is an axis of symmetry (S),
and wherein, in the components of type A, on a long side of the respective component, n−2 slots are arranged along a partial length of the respective sectional boundaries and are located between the edge sides and the axis of symmetry (S), and wherein, in the components of type B, n−4 slots are arranged along selected sectional boundaries and are located between the edge sides and the axis of symmetry (S), wherein, starting from a long side, a first portion of the n−4 slots are arranged along a partial length of the respective sectional boundaries, and, starting from the other long side, a second portion of the n−4 slots are arranged on the respective other sectional boundaries, and wherein, starting from a long side, at least 2 of the n−4 slots of the components of type B are each arranged along the sectional boundaries and are directly adjacent to the axis of symmetry, and, furthermore, starting from the other long side of the component, at least 2 of the n−4 slots of the component of type B are arranged along the sectional boundaries and are adjacent to the respective edge sides, and n is one of 8, 10, and 12.

2. The construction kit according to claim 1, further characterized in that n is 8, the components of types A and B are subdivided into 8 equally large sections, which are bounded by 9 sectional boundaries, wherein, in the components of type A, 6 slots are arranged, which are disposed along a partial length of the respective sectional boundaries and are located between the edge sides and the axis of symmetry (S), and wherein, in the components of type B, 4 slots are arranged, which are disposed along a partial length of the respective sectional boundaries, of which, starting from a long side, 2 slots are each arranged along the sectional boundaries and are directly adjacent to the axis of symmetry, and wherein, starting from the other long side of the component, 2 slots are arranged along the sectional boundaries and are adjacent to the respective edge sides.

3. The construction kit according to claim 1, further characterized in that n is 10, the components of types A and B are subdivided into 10 equally large sections, which are bounded by 11 sectional boundaries, wherein, in the components of type A, 8 slots are arranged, which are disposed along a partial length of the respective sectional boundaries and are located between the edge sides and the axis of symmetry (S), and wherein, in the components of type B, 6 slots are arranged, which are disposed along a partial length of the respective sectional boundaries, 2 slots of which, starting from a long side, are each arranged along the sectional boundaries and are directly adjacent to the axis of symmetry, and wherein 2 slots, starting from the other long side of the component, are arranged along the sectional boundaries and are adjacent to the respective edge sides, and 2 other slots are arranged on the respective sectional boundaries of this long side and are directly adjacent to these slots adjacent to the respective edge side.

4. The construction kit according to claim 1, further characterized in that n is 12, the components of types A and B are subdivided into 12 equally large sections, which are bordered by 13 sectional boundaries, wherein, in the components of type A, 10 slots are arranged, which are disposed along a partial length of the respective sectional boundaries and are located between the edge sides and the axis of symmetry (S), and wherein the construction kit further comprises components of two different B types, namely B1 and B2, each of which has 8 slots, which are arranged along a partial length of the respective sectional boundaries, wherein, in the component of type B1, starting from a long side, 2 slots are each arranged along a partial length of the respective sectional boundaries and are directly adjacent the axis of symmetry, and, starting from the other long side of the component, 6 slots are arranged along a partial length of the respective three adjacent sectional boundaries and are located between the respective edge regions and the axis of symmetry (S), and wherein, in the component of type B2, starting from a long side, 6 slots are each arranged along a partial length of the respective sectional boundaries and are located between the axis of symmetry (S) and the respective edge sides, and, starting from the other long side of the component, 2 slots are arranged along a partial length of the respective sectional boundaries and are directly adjacent to the respective edge sides.

5. The construction kit according to claim 1, further characterized in that the slots of the components of type A each have an identical length and the slots of the components of type B each have an identical length, and the sum of the lengths is greater than or equal to the width of the components.

6. The construction kit according to claim 1, further characterized in that the slots of the components have a width, wherein the width is greater than or equal to the thickness of the components, wherein, when components of different thickness are used, the width is greater than or equal to the thickness of the components with the greatest thickness.

7. The construction kit according to claim 1, further characterized in that the components of type A and the components of type B have at least one fold, which is arranged along a sectional boundary.

8. The construction kit according to claim 1, further characterized in that the components are produced from materials selected from the group consisting of cardboard, corrugated cardboard, paperboard, wood, plastic, metal, textile fabric and composite materials thereof.

9. The construction kit according to claim 1, further characterized in that the components have a protective layer, selected from water-repellant and/or flame-retardant materials and/or a decorative layer, selected from paints, films, lacquers, textiles, and/or flocking.

10. The construction kit according to claim 1, further characterized in that openings are provided in the components, into which at least one of rods, tubes, pipes, wires, bands, and cords can be inserted.

11. A method for producing an installation assembly comprising providing a construction kit according to claim 1 and building a frame structure by joining a plurality of components of type A to one another by inserting the respective slots into one another and, when a construction kit for which n is 8 or 10 is used, terminating the two open edge regions by a component of type B or, when a construction kit for which n is 12 is used, terminating the two open edge regions with a component of type B1 and of type B2.

12. An installation assembly, produced using a construction kit according to claim 1, wherein the installation assembly is one of a bed, a stool, a platform, and a seat.

* * * * *